United States Patent
Cronholm et al.

(10) Patent No.: US 9,733,763 B2
(45) Date of Patent: Aug. 15, 2017

(54) PORTABLE DEVICE USING PASSIVE SENSOR FOR INITIATING TOUCHLESS GESTURE CONTROL

(71) Applicant: CRUNCHFISH AB, Malmö (SE)

(72) Inventors: Paul Cronholm, Malmö (SE); Martin Henriz, Lund (SE)

(73) Assignee: CRUNCHFISH AB, Malmö (SE)

( * ) Notice: Subject to any disclaimer, the term of this patent is extended or adjusted under 35 U.S.C. 154(b) by 6 days.

(21) Appl. No.: 14/780,292

(22) PCT Filed: Apr. 3, 2014

(86) PCT No.: PCT/SE2014/050404
§ 371 (c)(1),
(2) Date: Sep. 25, 2015

(87) PCT Pub. No.: WO2014/168558
PCT Pub. Date: Oct. 16, 2014

(65) Prior Publication Data
US 2016/0054858 A1    Feb. 25, 2016

(30) Foreign Application Priority Data
Apr. 11, 2013    (SE) .................................. 1350454

(51) Int. Cl.
*G06F 3/042* (2006.01)
*G06F 3/00* (2006.01)
(Continued)

(52) U.S. Cl.
CPC .......... *G06F 3/0425* (2013.01); *G06F 1/3231* (2013.01); *G06F 3/005* (2013.01);
(Continued)

(58) Field of Classification Search
CPC ........ G06F 1/3231; G06F 3/005; G06F 3/017; G06F 3/0304; G06F 3/0425;
(Continued)

(56) References Cited

U.S. PATENT DOCUMENTS

2007/0259685 A1* 11/2007 Engblom .............. G06F 1/1626
455/550.1
2008/0111710 A1*  5/2008 Boillot .................. G06F 3/0346
341/22
(Continued)

FOREIGN PATENT DOCUMENTS

| WO | WO 96/36960 | 11/1996 |
| WO | WO 2011/069148 A1 | 6/2011 |
| WO | WO 2014/052895 A1 | 4/2014 |

*Primary Examiner* — Joe H Cheng
(74) *Attorney, Agent, or Firm* — Birch, Stewart, Kolasch & Birch, LLP

(57) ABSTRACT

A portable device (100) comprising a controller (210), a memory (240), a camera (160) and a passive proximity sensor (170). The controller being configured for receiving input from said passive proximity sensor (170) indicating a light environment in front of the passive proximity sensor (170) detecting a change in light environment, determining a light pattern (P) of changes in light environment, determining if the light pattern (P) matches a stored initiating pattern, which is stored in the memory (240), and if so, accepting the light pattern (P) and in response thereto activating the camera (160), identifying an object (H) in front of the camera (160) and tracking the object (H) thereby enabling touchless gesture control of the portable device (100), characterized in that the passive proximity sensor is an ambient light sensor and the light pattern consists of a series of changes between dark and light (dark is light below a threshold, light is light above a second threshold).

20 Claims, 4 Drawing Sheets

(51) Int. Cl.
*G06F 3/0488* (2013.01)
*G06F 3/01* (2006.01)
*G06F 1/32* (2006.01)

(52) U.S. Cl.
CPC .............. *G06F 3/011* (2013.01); *G06F 3/017* (2013.01); *G06F 3/042* (2013.01); *G06F 3/04883* (2013.01); *G06F 1/325* (2013.01); *G06F 2203/0381* (2013.01); *G06F 2203/04108* (2013.01); *Y02B 60/1289* (2013.01)

(58) Field of Classification Search
CPC ........... G06F 3/0488; G06F 2203/0381; G06F 2203/04108; G06K 9/00355; H04M 2250/22
See application file for complete search history.

(56) References Cited

U.S. PATENT DOCUMENTS

| | | | |
|---|---|---|---|
| 2009/0102788 A1* | 4/2009 | Nishida | G06F 3/014 345/158 |
| 2010/0308958 A1* | 12/2010 | Kim | G06F 3/017 340/5.1 |
| 2010/0321289 A1* | 12/2010 | Kim | G06F 1/1626 345/156 |
| 2011/0134251 A1 | 6/2011 | Kim et al. | |
| 2011/0187652 A1 | 8/2011 | Huibers | |
| 2011/0260882 A1* | 10/2011 | Lee | H04M 1/72577 340/686.6 |
| 2011/0299737 A1* | 12/2011 | Wang | G06F 3/017 382/107 |
| 2011/0310005 A1 | 12/2011 | Chen et al. | |
| 2011/0312349 A1 | 12/2011 | Forutanpour et al. | |
| 2012/0206414 A1* | 8/2012 | Tada | G06F 1/1643 345/175 |
| 2012/0316661 A1* | 12/2012 | Rahman | G06F 1/1694 700/94 |
| 2013/0009875 A1 | 1/2013 | Fry et al. | |
| 2014/0113592 A1* | 4/2014 | Wu | G06F 21/44 455/411 |
| 2014/0118257 A1* | 5/2014 | Baldwin | G06F 3/017 345/158 |
| 2014/0240464 A1* | 8/2014 | Lee | G01S 17/08 348/47 |
| 2015/0220749 A1* | 8/2015 | Cronholm | G06K 9/00355 726/30 |
| 2015/0220776 A1* | 8/2015 | Cronholm | G06F 3/017 382/103 |
| 2015/0363003 A1* | 12/2015 | Henriz | G06F 3/0481 345/156 |
| 2015/0363004 A1* | 12/2015 | Cronholm | G06F 3/011 345/156 |

* cited by examiner

PORTABLE DEVICE USING PASSIVE SENSOR FOR INITIATING TOUCHLESS GESTURE CONTROL

TECHNICAL FIELD

This application relates to a method, a computer-readable medium and a portable device, such as a mobile communications terminal, having a passive sensor and utilizing the passive sensor for initiating touchless gesture control.

BACKGROUND

Touchless gesture control based on camera capture requires that the camera is either always turned on and continuously analyses gestures in front of the camera to determine if the gesture is for controlling the device or for another purpose. Alternatively the device is manually turned on to receive touchless input.

If the camera is always switched on it draws a lot of power, which is highly unsuitable for a portable device, such as a mobile communications terminal for example a smartphone or a tablet computer, running on battery power. It is also damaging to the environment as power is used even when not necessarily needed.

To overcome these problems, some portable devices enable the user to manually switch on the camera when needed. This requires manual hands-on operation which is in contrast to the concept of touchless interaction.

There is thus a need for an improved manner of initiating touchless control that does not consume power and which is in line with touchless control.

SUMMARY

The inventors of the present invention have realized, after inventive and insightful reasoning that by utilizing a passive light environment sensor, such as an ambient light sensor or a passive proximity sensor, it is possible to indirectly detect a gesture.

Even though the passive light environment sensor is not able or arranged to detect an object performing a gesture, the inventors have realized the simple solution to utilize such a passive light environment sensor to indirectly detect the gesture. Since such sensors are often already arranged in portable devices such as a mobile communications terminal, the invention disclosed herein may beneficially be used as a software solution for already existing hardware. Especially so in combination with the object tracking manner disclosed in Swedish patent application no. SE 1250910-5 which claims priority to U.S. provisional Application No. 61/679,510.

Since a passive sensor requires much less power than a camera and also the controller controlling the input received from a passive light environment sensor also requires less power, as the computations needed for passive light environment sensor input control are less advanced than for camera input control, the overall power consumption is reduced significantly during periods of touchless inactivity.

It is an object of the teachings of this application to overcome the problems listed above by providing a portable device comprising a controller, a memory, a camera and a passive proximity sensor, wherein the controller is configured to receive input from said passive proximity sensor indicating a light environment in front of the passive proximity sensor, detect a change in light environment, determine a light pattern of changes in light environment, determine if the light pattern matches a stored initiating pattern, which is stored in the memory, and if so, accept the light pattern and in response thereto activate the camera, identify an object in front of the camera and track the object thereby enabling touchless gesture control of the portable device, characterized in that the passive proximity sensor is an ambient light sensor and the light pattern consists of a series of changes between dark and light (dark is light below a threshold, light is light above a second threshold).

Such a portable device enables for an improved initiation of a touchless gesture control as it reduces the power needed while still enabling the initiation to be done in a touchless manner. The reason why the power is reduced is because the passive proximity sensor requires much less power than a camera and the recognition of a light changing pattern also requires less computing power (and hence less power) than the recognition of an object performing a gesture.

It should be noted that the use of a passive sensor requires much less power than an active sensors, such as cameras and can thus be used at a very low power cost while keeping the active camera deactivated—thereby significantly reducing the power consumption of the device. The camera is not started unnecessarily, but only when there actually is a user that wants to use the device.

It should further be noted that the inventors of this application has realized that also a sensor not originally designed for detecting a movement may be utilized for detecting a gesture, by a clever indirect measurement as disclosed herein.

It should also be noted that a light pattern is not to be equated with a simple change in light intensity, but would require distinct changes, such as either very sudden or preferably repeated changes.

In one embodiment, the portable device is a mobile communications terminal such as a tablet computer, a smartphone or a laptop computer. In one embodiment, the portable device is a game console. In one embodiment, the portable device is a media device such as a music and/or video playing device.

It is also an object of the teachings of this application to overcome the problems listed above by providing a method for use in a method for use in a portable device comprising a controller, a memory, a camera and a passive proximity sensor, the method comprising receiving input from said passive proximity sensor indicating a light environment in front of the passive proximity sensor, detecting a change in light environment, determining a light pattern of changes in light environment, determining if the light pattern matches a stored initiating pattern, which is stored in the memory, and if so, accepting the light pattern and in response thereto activating the camera, identifying an object in front of the camera and tracking the object thereby enabling touchless gesture control of the portable device, characterized in that the passive proximity sensor is an ambient light sensor and the light pattern consists of a series of changes between dark and light (dark is light below a threshold, light is light above a second threshold).

It is a further object of the teachings of this application to overcome the problems listed above by providing a computer readable medium comprising instructions that when loaded into and executed by a controller, such as a processor, cause the execution of a method according to herein.

The teachings herein find use in control systems for devices having user interfaces such as mobile phones, smart phones, tablet computers, laptop computers, gaming consoles and media and other infotainment devices.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
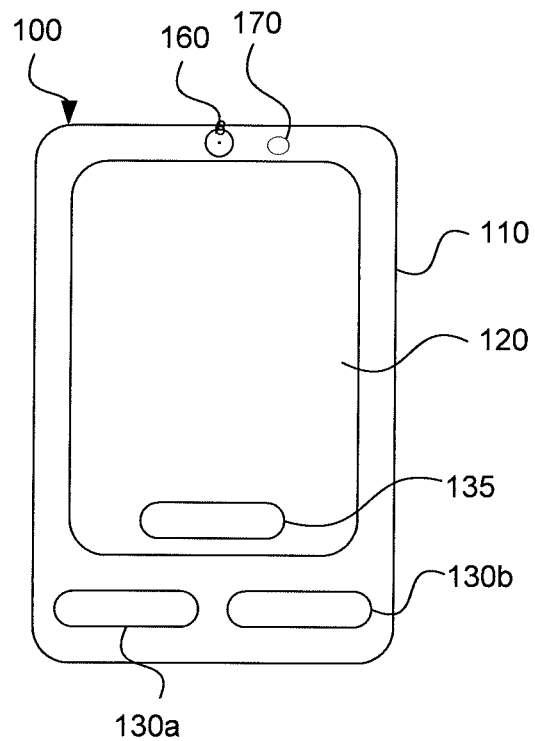
FIGS. 1A and 1B are schematic views of each a portable device according to the teachings herein.
Figure 1B:
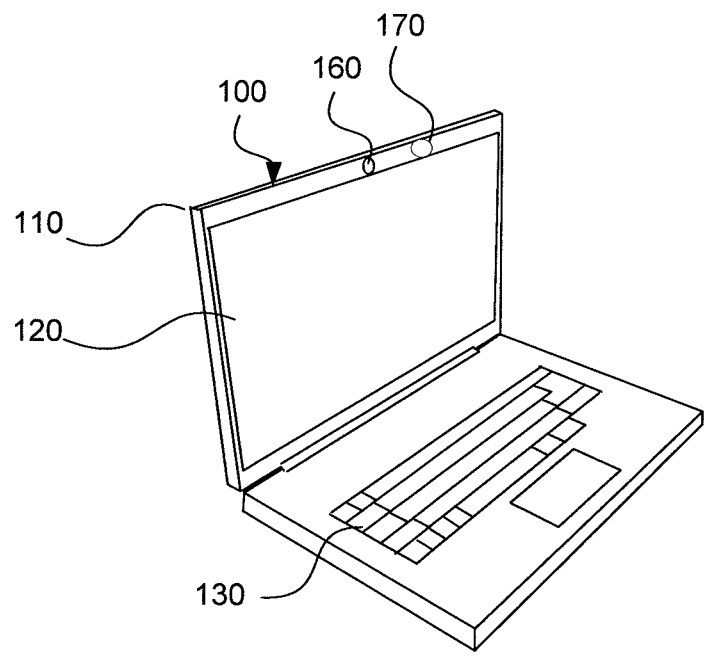

FIG. 1 generally shows a portable device 100 according to an embodiment herein. In one embodiment the portable device 100 is configured for network communication, either wireless or wired. Examples of a portable device 100 are: a laptop computer, a tablet computer, a mobile communications terminal such as a mobile telephone or a smart phone, a personal digital assistant and a game console. Two embodiments will be exemplified and described as being a smartphone in FIG. 1A, a laptop computer 100 in FIG. 1B as an example of a computer and a tablet computer.

Referring to FIG. 1A a mobile communications terminal in the form of a smartphone 100 comprises a housing 110 in which a display 120 is arranged. In one embodiment the display 120 is a touch display. In other embodiments the display 120 is a non-touch display. Furthermore, the smartphone 100 comprises two keys 130a, 130b. In this embodiment there are two keys 130, but any number of keys is possible and depends on the design of the smartphone 100. In one embodiment the smartphone 100 is configured to display and operate a virtual key 135 on the touch display 120. It should be noted that the number of virtual keys 135 are dependant on the design of the smartphone 100 and an application that is executed on the smartphone 100. The smartphone 100 is also equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

The smartphone 100 is further equipped with a passive proximity sensor possibly being a passive light environment sensor 170. The passive proximity sensor 170 is a sensor 270 as disclosed below with reference to FIG. 2.

Referring to FIG. 1B a laptop computer 100 comprises a display 120 and a housing 110. The housing comprises a controller or CPU (not shown) and one or more computer-readable storage mediums (not shown), such as storage units and internal memory. Examples of storage units are disk drives or hard drives. The laptop computer 100 further comprises at least one data port. Data ports can be wired and/or wireless. Examples of data ports are USB (Universal Serial Bus) ports, Ethernet ports or WiFi (according to IEEE standard 802.11) ports. Data ports are configured to enable a laptop computer 100 to connect with other computing devices or a server.

The laptop computer 100 further comprises at least one input unit such as a keyboard 130. Other examples of input units are computer mouse, touch pads, touch screens or joysticks to name a few.

The laptop computer 100 is further equipped with a camera 160. The camera 160 is a digital camera that is arranged to take video or still photographs by recording images on an electronic image sensor (not shown). In one embodiment the camera 160 is an external camera. In one embodiment the camera is alternatively replaced by a source providing an image stream.

The smartphone 100 is further equipped with a passive proximity sensor possibly being a passive light environment sensor 170. The passive proximity sensor 170 is a sensor 270 as disclosed below with reference to FIG. 2.

Figure 2:
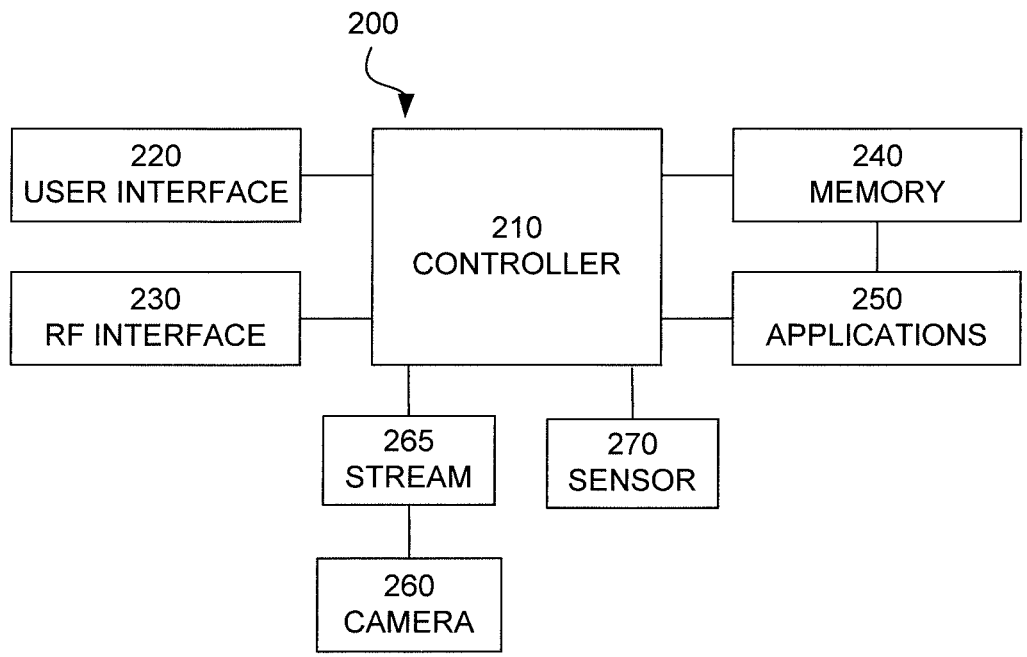
FIG. 2 is a schematic view of the components of a portable device according to the teachings herein.

FIG. 2 shows a schematic view of the general structure of a device according to FIG. 1. The device 100 comprises a controller 210 which is responsible for the overall operation of the computing device 200 and is preferably implemented by any commercially available CPU ("Central Processing Unit"), DSP ("Digital Signal Processor") or any other electronic programmable logic device. The controller 210 is configured to read instructions from the memory 240 and execute these instructions to control the operation of the computing device 100. The memory 240 may be implemented using any commonly known technology for computer-readable memories such as ROM, RAM, SRAM, DRAM, CMOS, FLASH, DDR, SDRAM or some other memory technology. The memory 240 is used for various purposes by the controller 210, one of them being for storing application data and program instructions 250 for various software modules in the computing device 200. The software modules include a real-time operating system, drivers for a user interface 220, an application handler as well as various applications 250.

The computing device 200 further comprises a user interface 220, which in the computing device of FIGS. 1A and 1B is comprised of the display 120 and the keys 130, 135.

The computing device 200 may further comprises a radio frequency interface 230, which is adapted to allow the computing device to communicate with other devices through a radio frequency band through the use of different radio frequency technologies. Examples of such technologies are IEEE 802.11, IEEE 802.15, ZigBee, WirelessHART, WIFI, Bluetooth®, W-CDMA/HSPA, GSM, UTRAN and LTE to name a few.

The computing device 200 is further equipped with a camera 260. The camera 260 is a digital camera that is arranged to take video or still photographs by recording images on an electronic image sensor (not shown).

The camera 260 is operably connected to the controller 210 to provide the controller with a video stream 265, i.e. the series of images captured, for further processing possibly for use in and/or according to one or several of the applications 250.

In one embodiment the camera 260 is an external camera or source of an image stream.

The smartphone 200 is further equipped with a passive proximity sensor 270. In one embodiment the passive proximity sensor 270 is a passive light environment sensor.

A passive light environment sensor is a sensor 170, 270 arranged to detect the light environment in front of the sensor 170, 270. The detection is made passively, without actively sending, transmitting or radiating any signal or other waveform such as infrared light or other light types. The passive light environment sensor is only arranged to detect the light environment—i.e. to discern between light/dark (possibly in different degrees), not to make photographic captures. One example of such a passive light environment sensor is an ambient light sensor, ALS.

An ambient light sensor is a specific version of a photodiode. A photodiode is a type of photo detector capable of converting light into a voltage or current, this depends on the mode of operation. A benefit of Ambient Light Sensors is that they perceive brightness in the same way as human eyes do. Another benefit is that only require a minimum of (battery) power.

The passive light environment sensor is not designed to track an object and to provide detailed light data. Only a reading on the ambient light environment is provided by the passive light environment sensor.

The ALS is also not originally arranged to detect any movement or motions. Only the ambient light level. Further more am ALS does not require additional hardware such as LED or an infrared light source.

The ALS is a preferred embodiment in that it is capable of detecting light levels in fine grade, does not require additional hardwire, is already implemented in many portable devices and thus allow for a simple software update to enable a portable device to operate according to the teachings herein, and it does not add to the cost of making new portable devices as they would most likely be equipped with an ALS for other purposes anyway. Furthermore the ALS has a superior power consumption which is in line with the problem to be solved.

Other examples of passive proximity sensors are electrical, capacitive and magnetic sensors arranged possibly not to detect the actual light in font of the sensor, but to detect a presence of an object in front of the sensor or possibly the distance to the object.

The inventors have realized though that the proximity to an or presence of an object may used to be an equivalent to a light environment in that dark equals close and light equals remote. For the purpose of this application, the distance to or presence of an object to the sensor will thus indicate a light environment in front of the sensor. A proximity pattern is thus equal to a light pattern for the purpose of describing the functionality of this invention.

It should also be noted that a light pattern is not to be equated with a simple change in light intensity, but would require distinct changes, such as either very sudden or preferably repeated changes.

It is important to note that the passive proximity sensor 170 is not originally arranged to detect and track an object for identifying a gesture, it is only arranged to passively detect another physical entity, such as light level or capacitance, but the input may inventively be used to indirectly identify a gesture.

It is also important to note that such a sensor is possibly also envisioned to be part of a portable device's finished design and the use thus does not add to the cost of the finished portable device. The functionality may also be implemented in existing portable devices already equipped with such a sensor.

It should be noted that the use of a passive sensor requires much less power than the use of an active sensor such as a motion sensor and that it requires inventive thought, as has been the case for this application, to realize that the passive sensor may be used to indirectly function as a gesture detection means.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 3:
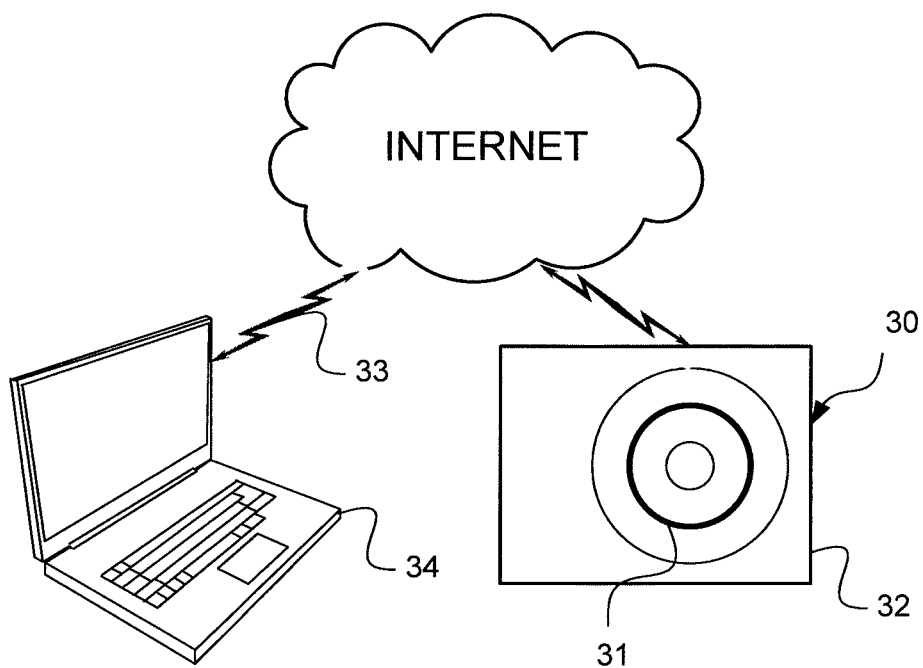
FIG. 3 is a schematic view of a computer-readable memory according to the teachings herein.

FIG. 3 shows a schematic view of a computer-readable medium as described in the above. The computer-readable medium 30 is in this embodiment a data disc 30. In one embodiment the data disc 30 is a magnetic data storage disc. The data disc 30 is configured to carry instructions 31 that when loaded into a controller, such as a processor, executes a method or procedure according to the embodiments disclosed above. The data disc 30 is arranged to be connected to or within and read by a reading device 32, for loading the instructions into the controller. One such example of a reading device 32 in combination with one (or several) data disc(s) 30 is a hard drive. It should be noted that the computer-readable medium can also be other mediums such as compact discs, digital video discs, flash memories or other memory technologies commonly used.

The instructions 31 may also be downloaded to a computer data reading device 34, such as a laptop computer or other device capable of reading computer coded data on a computer-readable medium, by comprising the instructions 31 in a computer-readable signal 33 which is transmitted via a wireless (or wired) interface (for example via the Internet) to the computer data reading device 34 for loading the instructions 31 into a controller. In such an embodiment the computer-readable signal 33 is one type of a computer-readable medium 30.

The instructions may be stored in a memory (not shown explicitly in FIG. 3, but referenced 240 in FIG. 2) of the laptop computer 34.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

An improved manner of providing initiating a camera for receiving touchless commands for touchless control of a device will be disclosed below with reference to the accompanying figures. The examples will be illustrated focusing on the gestures made and the resulting light patterns, but it should be clear that the processing is performed in part or fully in a computing device comprising a controller as disclosed above with reference to FIGS. 1 and 2 or caused to be performed by executing instructions stored on a computer-readable medium as disclosed with reference to FIG. 3.

Figure 4A:
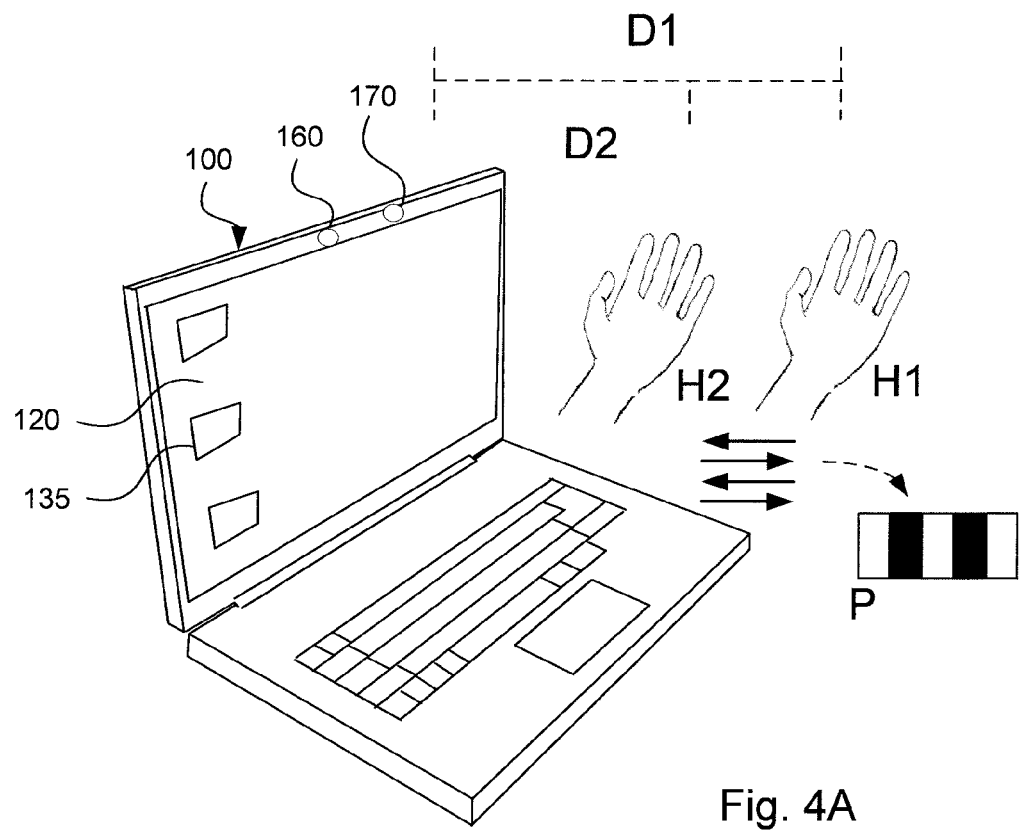
FIGS. 4A, 4B and 4C each shows an example embodiment according to the teachings herein.

FIG. 4A shows an example portable device such as in FIG. 1, in this example a laptop computer 100 such as the laptop computer 100 of FIG. 1B, configured to detect and track an object, in this example a hand H, via the camera 160. How such an object H is detected and tracked is disclosed in the Swedish patent application SE 1250910-5 and will not be discussed in further detail in the present application. For further details on this, please see the mentioned Swedish patent application. It should be noted, however, that the teachings of the present application may be implemented through the use of other tracking manners than disclosed in Swedish patent application SE 1250910-5.

To save power, the portable device 100 is arranged to turn off the camera 160 when touchless input is not to be received. To further reduce the power consumption, the portable device 100 may be configured to turn off the camera when a touchless input has not been identified or received within a threshold time period indicating inactivity.

However, to still allow a touchless control of the portable device 100, the portable device 100 is arranged with a passive proximity sensor 170, such as a passive light environment sensor 170. Such sensors 170 are commonly found in prior art portable devices. However, the sensor 170 of the portable device 100 according to the teachings of the present application is arranged, possibly in combination with the controller (referenced 210 in FIG. 2), to detect a movement pattern in front of the sensor and to identify a gesture from this movement and in response thereto activate the camera 160 for receiving an image stream in which objects, such as a user's hand, may be tracked for touchless control.

A user uses his hand H or other object to perform a gesture in front of the sensor 170 which gesture is detected by the laptop 100 by detecting a light changing pattern P. To illustrate the functionality an example is given where a user moves his hand H from a position H1 at a distance D1 from the laptop 100 to a second position H2 at a second, closer distance D2 to the laptop 100.

As the hand is at position H2 the light environment in front of the sensor 170 has changed to darker compared to when the hand is at position H1 as the hand H will block more light from reaching the sensor 170.

In this example the user moves his hand H from H1 to H2, back to H1 and then to H2 again and finally removes his hand (indicated by moving the hand back to H1 again). This movement pattern is illustrated with the arrows in FIG. 4A.

The movement pattern results in the sensor 170 being alternatively shaded thus causing a light changing pattern to be generated. The light changing pattern corresponding to the movement pattern is illustrated as black and white boxes in a series and referenced P in FIG. 4A. As can be seen in FIG. 4A the movement pattern generates the light changing pattern P "light/dark/light/dark/light".

The controller matches the received light changing pattern to a stored pattern and if there is a match the controller 210 activates the camera and the laptop 100 can be controlled in a touch less manner.

Figure 5:
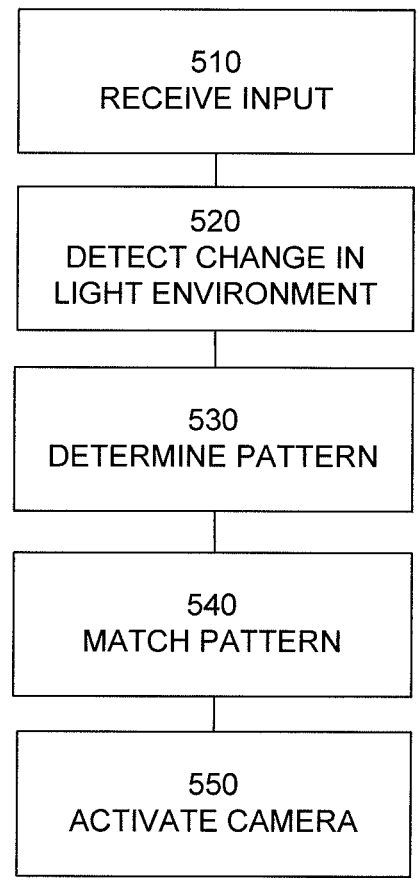
FIG. 5 shows a flowchart illustrating a general method according to an embodiment of the teachings herein.

In other words (see the flowchart of FIG. 5), the controller 210 is configured to receive light input 510 from a passive light environment sensor 170 indicating a light environment in front of the passive light environment sensor and to detect a change 520 in the light environment. The controller further determines 530 a pattern of changes in light environment, i.e. a light changing pattern and determines if the light pattern P matches 540 a stored initiating pattern, which is stored in the memory, and if so, accept the light pattern and in response thereto activate 550 the camera 160, identify an object, such as the user's hand H, in front of the camera 160 and track the object H thereby enabling touchless gesture control of the portable device 100.

As has been discussed in relation to FIG. 2, the light pattern consists of a series of changes between dark and light (dark is light below a threshold, light is light above a second threshold). Such changes are preferably rapid—as would be the case if a user performed a gesture in front of the ALS—and not a gradual change—as would occur for example at dusk or at dawn.

In one embodiment the changes are in a time relation with each other. The changes may be in a time-relation to the full pattern and wherein the controller is configured to buffer the detected light changes and detect the light pattern by retrochecking the received light input. That is the light changes are buffered and parsed backwards for determining if a light pattern has been detected. The whole pattern has to be buffered before a time frame can be established for determining if the time relation is fulfilled or not for the pattern.

In another embodiment the controller is determined to determine that a change happens within a time period. For example, the light/dark/light of a push gesture should be so that each segment is less than 0.3 s and that the total sequence is less than 0.5 s.

In one embodiment the controller is configured to determine that a light change in a sequence has approximately the same time extension as the average of the other changes in the light sequence.

It should be noted that the time relation of a time change may relate to the time it actually takes to change from one light condition to another or to the time for each light environment state.

Figure 4B:
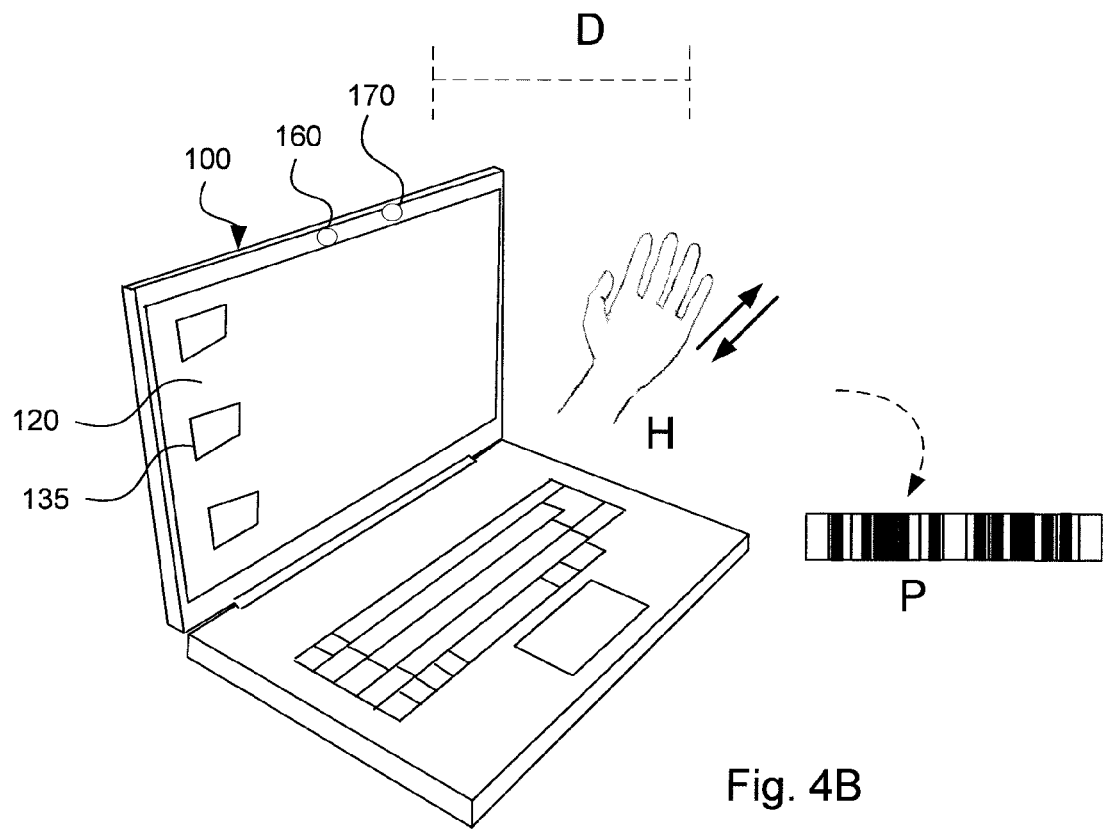

In one embodiment the controller is further configured to determine a direction in which a change in light occurs and wherein the light pattern further consists of the directions of the light changes. The example of FIG. 4B shows an example of such a pattern.

In one embodiment, the controller is further configured to prompt for a confirmation and detect a confirmation light pattern and determine if the confirmation light pattern indicates a confirmation and if so accept the light pattern.

A confirmation light pattern may be a push pattern (that is light/dark/light) or a repeat of the detected light pattern. The latter enables more advanced control. Using a repeat of the pattern is highly useful if the pattern is a simple pattern—or it becomes cumbersome to input a long range of patterns.

The prompt may be displayed on the display 120, possibly as a popup window, instructing the user to perform the confirmation input.

The prompt may also or alternatively be an audible prompt instructing the user to perform the confirmation input.

The portable device 100 may also be arranged with a movement sensor (not shown), such as an accelerometer or gyro (not shown). Such movement sensors are commonly found in portable devices and thus also do not require any modification to the hardware of a portable device.

In one embodiment the controller is configured to receive movement input from the movement sensor and determine if the portable device is moving or not while detecting the light pattern. If it is determined that the portable device is not moving the detected light pattern most likely is a consciously effected light pattern originating from a gesture and the pattern is accepted and the camera is activated.

In one embodiment the controller is further configured to prompt for a confirmation if it is detected that the portable device is moving while detecting the light pattern.

In one embodiment the controller is further configured to determine if the detected movement constitutes a moving pattern and if the moving pattern matches the light pattern. If so the light pattern is most likely a result of the movement and it is discarded, or the controller prompts for confirmation.

The movement pattern can be matched to the light pattern by comparing changes in direction with changes in light. If there is a correspondence there could be a match between the two patterns.

FIG. 4B shows an example computing device such as in FIG. 1, in this example a laptop computer 100 such as the laptop computer 100 of FIG. 1B, configured to detect and track an object, in this example a hand H, via the camera 160. In this example the laptop 100 is arranged with a sensor 170 which is able to detect in what direction the light changes (for example, from left to right). This enables for other movement patterns to be used. To illustrate the functionality a second example is given where a user moves his hand H from left to right and back again at a distance D from the laptop 100. This movement pattern is illustrated with the arrows in FIG. 4B.

As the hand H passes the sensor 170, the sensor 170 is first partially blocked, blocked, partially blocked and finally not blocked again.

The movement pattern results in the sensor 170 being alternatively shaded thus causing a light changing pattern to be generated. The light changing pattern corresponding to the movement pattern is illustrated as black and white boxes in a series and referenced P in FIG. 4B. The sensor is able to determine that the partial blocking is on a left or right side respectively thereby generating a partial light box in the light changing pattern. As can be seen in FIG. 4B the movement pattern generates the light changing pattern P "light/half dark left/half dark right/dark/half dark left/half dark right/light/half dark right/half dark left/dark/half dark right/half dark left/light".

After recognizing the light changing pattern the camera 160 is activated and the laptop can be controlled in a touch less manner.

In one embodiment the portable device is arranged with more than one sensor 170. The use of multiple sensors 170 enables for detecting a more complex pattern in that angles to an object may be determined. Furthermore, movement patterns may be more easily identifiable.

Figure 4C:
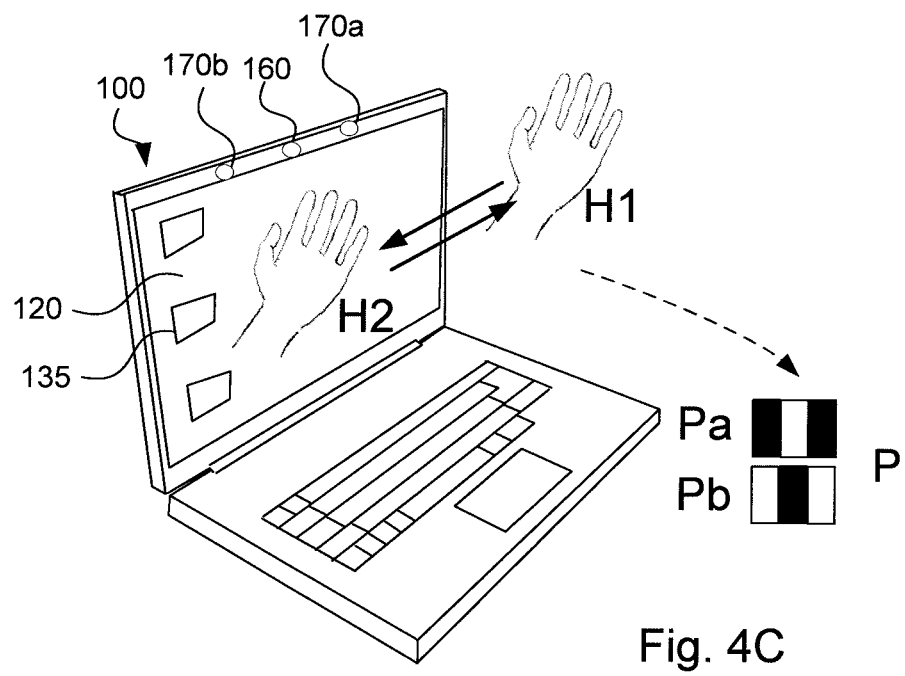

FIG. 4C shows an example of a portable device 100 having two sensors 170a and 170b. An object, such as a hand H, is placed in front of the portable device 100. As an example of a gesture, the hand H is moved from one position H1 in front of the first sensor 170a to a second position H2 in front of the second sensor 170b and back again. The resulting pattern P is detected as two sub-patterns Pa and Pb for the first and the second sensor 170a and 170b respectively. As can be seen Pa is dark/light/dark and Pb is light/dark/light. The two sub-patterns are, in one embodiment, timed with each other so that the pattern changes occur at approximately the same time or even overlapping.

The teachings herein provide the benefit that a user is able to initiate the touchless interface with a touchless command and not having to actually activate a special key or other manual input means, while the apparatus is able to reduce its power consumption as the camera 160 does not need to be active waiting to detect a gesture.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A portable device comprising:
a controller;
a memory;
a camera; and
a passive proximity sensor, wherein
the controller is configured to:
receive input from said passive proximity sensor indicating a light environment in front of the passive proximity sensor;
detect a change in the light environment;
determine a light pattern of changes in the light environment;
determine if the light pattern matches a stored initiating pattern, which is stored in the memory, and if so, accept the light pattern; and
in response to accepting the light pattern, being configured to
activate the camera,
identify an object in front of the camera, and
track the object, thereby enabling touchless gesture control of the portable device;
the passive proximity sensor is an ambient light sensor; and
the light pattern consists of a series of changes between dark and light, where dark is a light intensity below a threshold, and light is a light intensity above a second threshold.

2. The portable device of claim 1, wherein the passive proximity sensor is configured to detect a presence of an object and the light pattern is a proximity pattern.

3. The portable device of claim 2, wherein
the controller is further configured to determine a direction in which a change in light occurs, and
the light pattern further consists of the directions of the light changes.

4. The portable device of claim 2, wherein the controller is further configured to:
prompt for a confirmation,
detect a confirmation light pattern, and
determine if the confirmation light pattern indicates a confirmation and if so accept the light pattern.

5. The portable device of claim 1, wherein the changes are in a time relation with each other.

6. The portable device of claim 5, wherein
the controller is further configured to determine a direction in which a change in light occurs, and
the light pattern further consists of the directions of the light changes.

7. The portable device of claim 5, wherein the controller is further configured to:
prompt for a confirmation, and
detect a confirmation light pattern, and
determine if the confirmation light pattern indicates a confirmation and if so accept the light pattern.

8. The portable device of claim 1, wherein the changes are in a time-relation to a full pattern, and
wherein the controller is further configured to buffer the detected light changes and detect the light pattern by retro-checking the detected light changes.

9. The portable device of claim 8, wherein
the controller is further configured to determine a direction in which a change in light occurs, and
the light pattern further consists of the directions of the light changes.

10. The portable device of claim 1, wherein
the controller is configured to determine a direction in which a change in light occurs; and
the light pattern further consists of the directions of the light changes.

11. The portable device of claim 1, wherein the controller is further configured to
prompt for a confirmation;
detect a confirmation light pattern; and
determine if the confirmation light pattern indicates a confirmation and if so accept the light pattern.

12. The portable device of claim 1, further comprising:
a movement sensor; and
wherein the controller is further configured to
receive movement input from the movement sensor,
determine if the portable device is moving or not while detecting the light pattern, and
accept the pattern if the portable device is not moving.

13. The portable device of claim 12, wherein the controller is further configured to prompt for a confirmation if it is detected that the portable device is moving while detecting the light pattern.

14. The portable device of claim 12, wherein the controller is further configured to
determine if the detected movement constitutes a moving pattern,
determine if the moving pattern matches the light pattern, and
if there is a match, discard the light pattern or prompt for confirmation.

15. The portable device of claim 1, further comprising:
a second passive proximity sensor; and
wherein the pattern includes at least two sub-patterns, one sub-pattern for each passive proximity sensor.

16. The portable device of claim 15, wherein the at least two sub-patterns are timed with each other so that the pattern changes occur at approximately the same time or are overlapping.

17. The portable device of claim 1, wherein the portable device is a mobile communications terminal.

18. The portable device of claim 17, wherein the mobile communications terminal is a mobile phone.

19. A method for use in a portable device, the portable device including a controller, a memory, a camera and a passive proximity sensor, the method comprising:
receiving input from said passive proximity sensor indicating a light environment in front of the passive proximity sensor;
detecting a change in the light environment;
determining a light pattern of changes in the light environment;
determining if the light pattern matches a stored initiating pattern, which is stored in the memory, and if so, accepting the light pattern; and
in response to accepting the light pattern:
activating the camera,
identifying an object in front of the camera, and
tracking the object, thereby enabling touchless gesture control of the portable device, wherein
the passive proximity sensor is an ambient light sensor, and
the light pattern consists of a series of changes between dark and light, where dark is a light intensity below a threshold, and light is a light intensity above a second threshold.

20. A non-transitory computer readable storage medium encoded with instructions that, when loaded and executed on a controller of a portable device, causes the controller to perform the method according to claim 19.

* * * * *